Patented Aug. 20, 1946

2,406,110

UNITED STATES PATENT OFFICE 2,406,110

MANUFACTURE OF HYDROCARBONS

Louis Schmerling, Riverside, Ill., assignor to Universal Oil Products Company, Chicago, Ill., a corporation of Delaware No Drawing. Application March 31, 1943, Serial No. 481,281

11 Claims. (Cl. 260—683.6)

The present invention is concerned with processes for the synthesis of paraffinic hydrocarbons of branched structure which are useful as constituents of high antiknock motor fuel blends.

Isoparaffin hydrocarbons of suitable boiling point constitute the best type of hydrocarbons for use in high compression spark type ignition engines such as aviation engines. These hydrocarbons are definitely superior to the normal paraffin hydrocarbons in respect to their relative antiknock value and they are generally superior to cyclo paraffin hydrocarbons of an equal number of carbon atoms per molecule. They are better than corresponding olefinic hydrocarbons in their stability during storage and are generally more desirable than aromatic hydrocarbons on account of their lower solidification points. Consequently, considerable effort is being made to produce the branched chain paraffinic hydrocarbons in increasing quantities for commercial use. In general the antiknock value of a paraffin hydrocarbon increases with its degree of branching in the molecule and it is an object of the present invention to provide a process for the manufacture of highly branched paraffinic hydrocarbons.

In a broad aspect the invention comprises a process for manufacturing branched chain paraffin hydrocarbons which consists in reacting a mono-olefinic hydrocarbon with a methyl halide in the presence of a catalyst to produce a higher molecular weight mono-olefin and hydrogenating the mono-olefin to the corresponding paraffin.

In one specific embodiment the invention comprises a process for the manufacture of 2,2,3-trimethyl butane which consists in reacting tetramethyl ethylene with methyl iodide in the presence of lead oxide to form 2,3,3-trimethyl butene-1 and lead iodide, hydrogenating the butene to produce 2,2,3-trimethyl butane, reacting the lead iodide with methyl sulfate to form methyl iodide and lead sulfate, treating the lead sulfate with an alkali metal carbonate to reform lead oxide, and recycling the methyl iodide and lead oxide to further use.

In a further embodiment the 2,2,3-trimethyl butane may be made by starting with an isoamylene such as, for example, trimethyl ethylene.

The reactions involved in the steps of the process are typified by those shown in the following equations which occur in the manufacture of 2,2,3-trimethyl butane from tetramethyl ethylene:

I

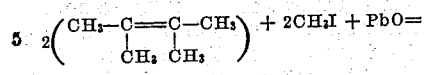

Tetramethyl ethylene

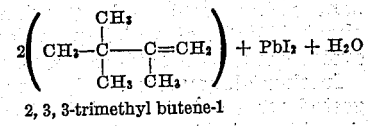

2, 3, 3-trimethyl butene-1

II

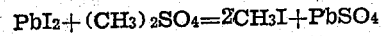

III

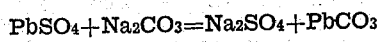

IV

In the first step of the process as represented by Equation 1 preceding reaction is brought about at temperatures of from about 200 to about 250° C. and either according to batch or continuous procedures. In the batch procedure a slight excess of the lead oxide over the molecular requirement shown in the equation may be added to a pressure vessel, the equivalent amounts of the olefin and the methyl halide added, the vessel closed and then heated to a temperature within the range specified. After being held at this temperature until reaction is complete as indicated by a constant pressure, the vessel is cooled, the pressure released and the hydrocarbon reaction products and any unreacted methyl halides separated from the lead compounds and fractionated to recover the desired heptene and unreacted charge. The unreacted portions can be combined and reproportioned and subjected to further action in the presence of fresh or regenerated lead oxide. Methyl iodide boils at 41–42° C., tetramethyl ethylene at 73° C., and the 2,2,3-trimethyl butene-1 at about 78° C., so that no difficulty will attend the separation of the reaction products by ordinary fractionation methods.

The first step of the process may be conducted in a continuous manner by passing a proportioned mixture of tetramethyl ethylene and methyl iodide over granular lead oxide contained in a reaction chamber, the stream of reactants being diverted through a bed of fresh lead oxide as the initial mass of material becomes converted to lead iodide and the reaction stops.

In accordance with the next step of the process methyl iodide and lead oxide are regenerated by reacting lead iodide with dimethyl sulfate. Again the reaction may be brought about either by batch or continuous operations. Thus in a batch operation an approximately equivalent molecular mixture of dimethyl sulfate and lead iodide may be heated to a reaction temperature within the range of about 50 to about 180° C., and methyl iodide distilled and recovered for further use. As a variation of this procedure continuous operations may be conducted by adding the powdered lead iodide to a heated pool of dimethyl sulfate and methyl iodide distilled and recovered as long as the consistency of the reaction mixture permits.

To reform lead oxide from lead sulfate in the third step of the process, it may be either directly produced by heating lead sulfate in admixture with finely divided carbon at a temperature of from about 550 to about 650° C., or in admixture with an alkali metal carbonate at a red heat. In this alternative method the principal products will be lead oxide, sulfur dioxide and carbon monoxide. In the regeneration by using sodium carbonate, a mixture of sodium sulfate and lead carbonate will be formed first, the sodium sulfate washed out with water and the lead carbonate converted to lead oxide by heating to about 400° C., at which point carbon dioxide is evolved and lead oxide remains as a residue. As a further alternative the lead sulfate may be digested with a hot solution of sodium or potassium bicarbonate.

While the process has been described in connection with the use of tetramethyl ethylene as a hydrocarbon charging stock, substantial yields of 2,3,3-trimethyl butene-1 may be produced when utilizing such compounds as trimethyl ethylene, since in the first reaction of this compound tetramethyl ethylene is formed according to the following equation and the tetramethyl ethylene then reacts further with the methyl halide to form the 2,3,3-trimethyl butene:

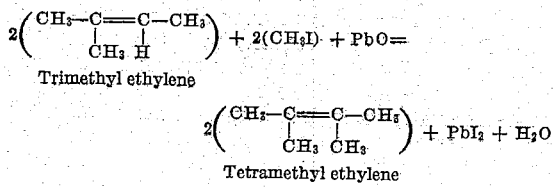

The hydrocarbon charging stocks for the process may be made by any available method such as the dehydration of corresponding alcohols. Tetramethyl ethylene may be conveniently prepared by reacting tertiary butyl chloride and ethylene to form an alkyl halide which can be dehydrohalogenated to form the substituted ethylene. Thus the charging stock of the process for the manufacture of 2,2,3-trimethyl butane may be made from olefins produced incidental to the cracking of hydrocarbon oils to produce gasoline since both isobutylene and ethylene occur in cracked gas mixtures.

The preferred oxide of lead for use in the first step of the process is the monoxide commonly known as litharge, which is readily available commercially. The higher oxides of lead, including the dioxide, the sesquioxide and the red oxide known as minium, have too great tendencies to oxidize the hydrocarbons involved in the reactions, while the suboxide is substantially unreactive.

The following example is given to indicate the character of results obtainable in utilizing the present process for the manufacture of 2,2,3-trimethyl butane, which is known as "triptane." The data given are merely illustrative, however, and are not introduced with the intention of unduly circumscribing the proper scope of the invention.

18 parts by weight of methyl iodide, 10 parts by weight of tetramethyl ethylene, and 15 parts by weight of powdered litharge, were placed in a pressure vessel, the vessel closed and heated at a temperature of 210° C. for a period of four hours. After release of pressure the liquid product was separated from the lead iodide and then fractionated to recover unreacted methyl iodide from hydrocarbons. It was found that a 90 per cent volume yield of hydrocarbons based on the tetramethyl ethylene charge had been obtained. This hydrocarbon layer was separated into fractions shown in the following table:

| Fraction | B. P., °C. | Volume, percent | $n_D^{20}$ |
|---|---|---|---|
| 1 | 56–72 | 22.8 | 1.4143 |
| 2 | 72–76 | 24.3 | 1.4069 |
| 3 | 77–77 | 28.5 | 1.4060 |
| Bottoms | | 2.9 | |
| | | 78.5 | |

Fraction number 3 boiling at 77° C. contained at least 85 percent of triptene. Fraction number 1 consisted principally of 2,3-dimethyl butene and fraction 2 consisted of a mixture of 2,3-dimethyl butene-2 and triptene. The triptene was identified by preparing the crystalline hydrate of 2,2,3-trimethyl butanol-3 (M. P. 76° C.) by first dissolving the olefin in 75 percent sulfuric acid, and then precipitating the alcohol by adding water.

Hydrogenation of fraction number 3 at 80° C. in the presence of a reduced nickel-kieselguhr catalyst gave a 90 percent yield of 2,2,3-trimethyl butane, boiling point 80° C. and melting point −28° C.

The lead iodide recovered from the primary step was mixed with one-half its weight of methyl sulfate and the mixture was heated slowly to a temperature of 150° C. At this temperature methyl iodide (boiling point 41° to 42° C.) distilled off and was recovered in an amount corresponding to over 95 percent of that used in the first step. The reaction mixture was then heated further to 190° C. in order to distill over the excess of methyl sulfate. The residue which consisted chiefly of lead sulfate was mixed with one-half its weight of anhydrous sodium carbonate and the mixture was heated at a red heat for two hours. The resulting mass was cooled, leached with water to remove sodium sulfate and leave lead oxide in a sufficiently pure state for reuse in the first step of the process.

I claim as my invention:

1. A process for the manufacture of 2,2,3-trimethyl butane which comprises reacting tetramethyl ethylene with methyl iodide in the presence of lead oxide to form lead iodide and 2,3,3-trimethyl butene-1, hydrogenating said last named compound in the presence of a catalyst, and reacting said lead iodide with methyl sulfate to form methyl iodide and lead sulfate.

2. A process for the manufacture of 2,2,3-trimethyl butane which comprises reacting tetramethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate to produce lead oxide and returning said methyl iodide and lead oxide to further use.

3. A process for the manufacture of 2,2,3-trimethyl butane which comprises reacting trimethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate to produce lead oxide and returning said methyl iodide and lead oxide to further use.

4. A process for the manufacture of 2,2,3-trimethyl butane which comprises reacting tetramethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate with carbon to produce lead oxide and returning said methyl iodide and lead oxide to further use.

5. A process for the manufacture of 2,2,3-trimethyl butane which comprises reacting trimethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate with carbon to produce lead oxide and returning said methyl iodide and lead oxide to further use.

6. A process for the manufacture of 2,2,3-trimethyl butane which comprises reacting tetramethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting with lead iodide with methyl sulfate to form methyl iodide and lead sulfate, treating said lead sulfate with an alkali metal carbonate to produce lead carbonate, heating said lead carbonate to produce lead oxide and returning said methyl iodide and lead oxide to further use.

7. A process for the manufacture of 2,2,3-trimethyl butane which comprises reacting trimethyl ethylene with methyl iodide in the presence of lead oxide to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate with an alkali metal carbonate to produce lead carbonate, heating said lead carbonate to produce lead oxide and returning said methyl iodide and lead oxide to further use.

8. A process for the manufacture of 2,2,3-trimethyl butane which comprises reacting tetramethyl ethylene with methyl iodide in the presence of lead oxide, at a temperature of from about 200° to about 250° C. to form 2,3,3-trimethyl butene-1 and lead iodide, hydrogenating said 2,3,3-trimethyl butene-1 in the presence of a catalyst to produce 2,2,3-trimethyl butane, reacting said lead iodide with methyl sulfate to form methyl iodide and lead sulfate, treating said lead sulfate with an alkali metal carbonate to produce lead carbonate, heating said lead carbonate to produce lead oxide and returning said methyl iodide and lead oxide to further use.

9. A process for the manufacture of 2,2,3-trimethyl butane which comprises reacting trimethyl ethylene with methyl iodide in the presence of lead oxide, at a temperature of from about 200° to about 250° C. to form 2,3,3-trimethyl butene-1 and lead iodide, hydrogenating said 2,3,3-trimethyl butene-1 in the presence of a catalyst to product 2,2,3-trimethyl butane, reacting said lead iodide with methyl sulfate to form methyl iodide and lead sulfate, treating said lead sulfate with an alkali metal carbonate to produce lead carbonate, heating said lead carbonate to produce lead oxide and returning said methyl iodide and lead oxide to further use.

10. A process for manufacturing branched chain paraffin hydrocarbons which comprises reacting a mono-olefinic hydrocarbon with a methyl halide in the presence of lead oxide to produce a higher molecular weight mono-olefin and hydrogenating said mono-olefin to the corresponding paraffin.

11. A process for manufacturing branched chain paraffin hydrocarbons which comprises reacting a mono-olefinic hydrocarbon with methyl iodide in the presence of lead oxide to produce a higher molecular weight mono-olefin and hydrogenating said mono-olefin to the corresponding paraffin.

LOUIS SCHMERLING.